(12) United States Patent
Lei et al.

(10) Patent No.: US 10,397,910 B2
(45) Date of Patent: Aug. 27, 2019

(54) CARRIER DETERMINATION FOR A DEVICE

(71) Applicant: Lenovo Innovations Limited (Hong Kong), Hong Kong (CN)

(72) Inventors: Haipeng Lei, Beijing (CN); Zukang Shen, Beijing (CN); Xiaodong Yu, Beijing (CN)

(73) Assignee: LENOVO INNOVATIONS LIMITED (HONG KONG), Hong Kong (CN)

( * ) Notice: Subject to any disclaimer, the term of this patent is extended or adjusted under 35 U.S.C. 154(b) by 76 days.

(21) Appl. No.: 15/476,497

(22) Filed: Mar. 31, 2017

(65) Prior Publication Data

US 2017/0289972 A1    Oct. 5, 2017

(30) Foreign Application Priority Data

Apr. 1, 2016  (WO) ................ PCT/CN2016/078267

(51) Int. Cl.
*H04W 72/04* (2009.01)
*H04W 72/08* (2009.01)
*H04W 72/12* (2009.01)
*H04W 74/08* (2009.01)
*H04L 5/00* (2006.01)

(52) U.S. Cl.
CPC ......... *H04W 72/042* (2013.01); *H04L 5/0053* (2013.01); *H04L 5/0094* (2013.01); *H04W 72/0453* (2013.01); *H04W 72/0486* (2013.01); *H04W 72/082* (2013.01); *H04W 72/1273* (2013.01); *H04W 74/085* (2013.01)

(58) Field of Classification Search
CPC ........... H04W 72/042; H04W 72/0453; H04W 74/085; H04W 72/082; H04W 72/1273; H04W 72/0486; H04W 72/04; H04W 72/08; H04W 72/12; H04W 74/08

USPC ........................................................ 370/329
See application file for complete search history.

(56) References Cited

U.S. PATENT DOCUMENTS

| | | | | |
|---|---|---|---|---|
| 8,379,578 | B2* | 2/2013 | Gorokhov | H04B 1/707 370/329 |
| 8,477,809 | B2* | 7/2013 | Mukkavilli | H04L 5/0048 370/204 |
| 9,106,385 | B2* | 8/2015 | Han | H04L 5/001 |
| 9,113,457 | B2* | 8/2015 | Yang | H04L 5/00 |
| 9,125,191 | B2* | 9/2015 | Papasakellariou | H04W 36/385 |

(Continued)

FOREIGN PATENT DOCUMENTS

| | | |
|---|---|---|
| CN | 101835261 A | 9/2010 |
| EP | 2408235 A1 | 1/2012 |

OTHER PUBLICATIONS

PCT/CN2016/078267, International Search Report and Written Opinion, dated Dec. 29, 2016, pp. 1-11.

*Primary Examiner* — Man U Phan
(74) *Attorney, Agent, or Firm* — Kunzler Bean & Adamson

(57) ABSTRACT

Apparatuses, methods, and systems are disclosed for carrier determination. One apparatus includes a processor that determines a first carrier of multiple carriers for a first device to transmit control information. The apparatus also includes a transmitter that transmits, to the first device, a first physical control signal indicating the first carrier, wherein the first physical control signal further indicates an interlace index for transmitting control information. The apparatus includes a receiver that receives control information from the first device on the first carrier.

26 Claims, 9 Drawing Sheets

(56) References Cited

U.S. PATENT DOCUMENTS

| | | | |
|---|---|---|---|
| 9,131,486 B2* | 9/2015 | Gorokhov | H04W 72/0413 |
| 9,210,695 B2* | 12/2015 | Kim | H04W 72/0413 |
| 9,369,994 B2* | 6/2016 | Lee | H04W 72/04 |
| 9,379,869 B2* | 6/2016 | Papasakellariou | H04L 1/1607 |
| 9,408,198 B2* | 8/2016 | Papasakellariou | H04W 36/385 |
| 9,479,309 B2* | 10/2016 | Han | H04L 5/0007 |
| 9,510,326 B2* | 11/2016 | Lee | H04W 72/042 |
| 9,622,234 B2* | 4/2017 | Takeda | H04L 1/0026 |
| 9,826,515 B2* | 11/2017 | Freda | H04L 1/18 |
| 9,839,012 B2* | 12/2017 | Gao | H04L 5/0007 |
| 9,883,503 B2* | 1/2018 | Seo | H04W 72/042 |
| 2010/0177694 A1* | 7/2010 | Yang | H04L 5/0053 370/328 |
| 2012/0113831 A1* | 5/2012 | Pelletier | H04L 5/0053 370/252 |
| 2013/0176957 A1 | 7/2013 | Gao et al. | |
| 2013/0242890 A1* | 9/2013 | He | H04W 72/0413 370/329 |
| 2018/0278373 A1* | 9/2018 | Wang | H04L 1/1812 |

\* cited by examiner

CARRIER DETERMINATION FOR A DEVICE

FIELD

The subject matter disclosed herein relates generally to wireless communications and more particularly relates to carrier determination for a device in a wireless communication system.

BACKGROUND

The following abbreviations are herewith defined, at least some of which are referred to within the following description.

3GPP Third Generation Partnership Project
ACK Positive-Acknowledgment
ANDSF Access Network Discovery and Selection Function
AP Access Point
APN Access Point Name
AS Access Stratum
B-IFDMA Block Interleaved Frequency Division Multiple Access
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CRS Cell-Specific Reference Signal
CSS Common Search Space
DCI Downlink Control Information
DL Downlink
DFT Discrete Fourier Transform
DMRS Demodulation Reference Signal
EDGE Enhanced Data Rates for Global Evolution
eNB Evolved Node B
EPDCCH Enhanced Physical Downlink Control Channel
E-RAB E-UTRAN Radio Access Bearer
ETSI European Telecommunications Standards Institute
E-UTRAN Evolved Universal Terrestrial Radio Access Network
FBE Frame Based Equipment
FDD Frequency Division Duplex
FDMA Frequency Division Multiple Access
FEC Forward Error Correction
GERAN GSM/EDGE Radio Access Network
GPRS General Packet Radio Service
GSM Global System for Mobile Communication
GTP GPRS Tunneling Protocol
HARQ Hybrid Automatic Repeat Request
H-PLMN Home Public Land Mobile Network
IFDMA Interleaved Frequency Division Multiple Access
IoT Internet-of-Things
IP Internet Protocol
ISRP Inter-System Routing Policy
LAA Licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NBIFOM Network-Based IP Flow Mobility
NB-IoT NarrowBand Internet of Things
OFDM Orthogonal Frequency Division Multiplexing
PCell Primary Cell
PBCH Physical Broadcast Channel
POD Physical Cell Identification ("ID")
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PRACH Physical Random Access Channel
PRB Physical Resource Block
PSD Power Spectrum Density
PSS Primary Synchronization Signal
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RE Resource Element
RRC Radio Resource Control
RS Reference Signal
RX Receive
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
SSS Secondary Synchronization Signal
TAU Tracking Area Update
TBS Transport Block Size
TCP Transmission Control Protocol
TDD Time-Division Duplex
TDM Time Division Multiplex
TEID Tunnel Endpoint Identification ("ID")
TTI Transmit Time Interval
TX Transmit
UCI Uplink Control Information
UE User Entity/Equipment (Mobile Terminal)
UL Uplink
UMTS Universal Mobile Telecommunications System
V-PLMN Visited Public Land Mobile Network
WiMAX Worldwide Interoperability for Microwave Access
WLAN Wireless Local Area Network In wireless communications networks, a frame structure for LTE FDD may be used. A radio frame of 10 milliseconds ("ms") may include 10 subframes, each of which is 1 ms. Each subframe further may include two slots, each of which is 0.5 ms. Within each slot, a number of OFDM symbols may be transmitted. The transmitted signal in each slot on an antenna port may be described by a resource grid comprising $N_{RB}^{UL} N_{sc}^{RB}$ subcarriers and $N_{symb}^{UL}$ OFDM symbols, where $N_{RB}^{UL}$ is a number of RBs in the UL (which is dependent on the transmission bandwidth of a cell); $N_{sc}^{RB}$ is the number of subcarriers in each RB; and each subcarrier occupies a certain frequency of size Δf. The values of $N_{sc}^{RB}$, Δf, and $N_{symb}^{UL}$ may depend on a cyclic prefix as shown in Table 1.

TABLE 1

| Configuration | | $N_{sc}^{RB}$ | $N_{symb}^{UL}$ |
|---|---|---|---|
| Normal Cyclic Prefix | Δf = 15 kHz | 12 | 7 |
| Extended Cyclic Prefix | Δf = 15 kHz | | 6 |
| | Δf = 7.5 kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

In certain wireless communication networks, an unlicensed spectrum may include operational requirements, such as an occupied bandwidth requirement, and a power spectrum density ("PSD") requirement. In one wireless communication network, a nominal channel bandwidth is the widest band of frequencies (including guard bands) assigned to a single channel. In certain networks, the nominal channel bandwidth should be at least 5 MHz. In various networks, an occupied channel bandwidth (e.g., the bandwidth containing 99% of the power of the signal) should be between 80% and 100% of the nominal channel bandwidth. In some networks, a maximum PSD is 10 dBm/MHz in ETSI with a resolution bandwidth of 1 MHz. Such a maximum PSD implies that a signal which occupies a small portion of the bandwidth may not be transmitted at the maximum available power at a UE due to the PSD and occupied bandwidth constraints. In some wireless communication networks, B-IFDMA based waveforms may be used for LAA PUCCH transmission. In such networks, transmissions may be inefficient.

BRIEF SUMMARY

Apparatuses for carrier determination are disclosed. Methods and systems also perform the functions of the apparatus. In one embodiment, the apparatus includes a processor that determines a first carrier of multiple carriers for a first device to transmit control information. In certain embodiments, the apparatus includes a transmitter that transmits, to the first device, a first physical control signal indicating the first carrier and wherein the first physical control signal further indicates an interlace index for transmitting control information. In some embodiments, the apparatus includes a receiver that receives control information from the first device on the first carrier.

In certain embodiments, the first physical control signal further indicates an interlace index to the first device. In some embodiments, the first physical control signal further indicates an orthogonal cover sequence index to the first device. In one embodiment, the processor determines a control channel for the first device. The control channel may be defined by at least one of an interlace index and an orthogonal cover sequence index. In such an embodiment, the transmitter transmits, to the first device, a second physical control signal indicating the control channel and the receiver receives control information from the first device using the control channel. In various embodiments, the transmitter transmits the first physical control signal to a second device, and the receiver receives control information from the second device on the first carrier. In some embodiments, the processor determines a time for the first device to transmit control information, the transmitter transmits, to the first device, a third physical control signal indicating the determined time, and the receiver receives control information from the first device during the determined time. In certain embodiments, the transmitter transmits the third physical control signal to a second device, and the receiver receives control information from the second device during the determined time. In some embodiments, the third physical control signal indicates a delay after the end of a transmission burst.

In certain embodiments, the processor determines a random backoff counter for the first device, and the transmitter transmits, to the first device, a fourth physical control signal indicating the random backoff counter. In various embodiments, the transmitter transmits, to a second device, the fourth physical control signal. In some embodiments, the processor determines the first carrier based on at least one of a load condition and an interference condition on the multiple carriers.

One method for carrier determination includes determining a first carrier of multiple carriers for a first device to transmit control information. The method also includes transmitting, to the first device, a first physical control signal indicating the first carrier. In certain embodiments, the method includes receiving control information from the first device on the first carrier.

Another apparatus for carrier determination includes a receiver that receives a first physical control signal indicating a first carrier of multiple carriers for transmitting control information. In certain embodiments, the apparatus includes a transmitter that transmits control information on the first carrier.

In some embodiments, the first physical control signal further indicates an interlace index for transmitting control information. In various embodiments, the first physical control signal further indicates an orthogonal cover sequence index for transmitting control information. In some embodiments, the receiver receives a second physical control signal indicating a control channel. The control channel may be defined by at least one of an interlace index and an orthogonal cover sequence index. In such embodiments, the transmitter transmits control information using the control channel. In certain embodiments, the receiver receives a third physical control signal indicating a time, and the transmitter transmits control information during the time.

In some embodiments, the third physical control signal indicates a delay after the end of a transmission burst. In certain embodiments, the apparatus includes a processor, the receiver receives a fourth physical control signal indicating a random backoff counter, and the processor performs listen-before-talk ("LBT") using the random backoff counter on the first carrier.

Another method for carrier determination includes receiving a first physical control signal indicating a first carrier of multiple carriers for transmitting control information. In certain embodiments, the method includes transmitting control information on the first carrier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
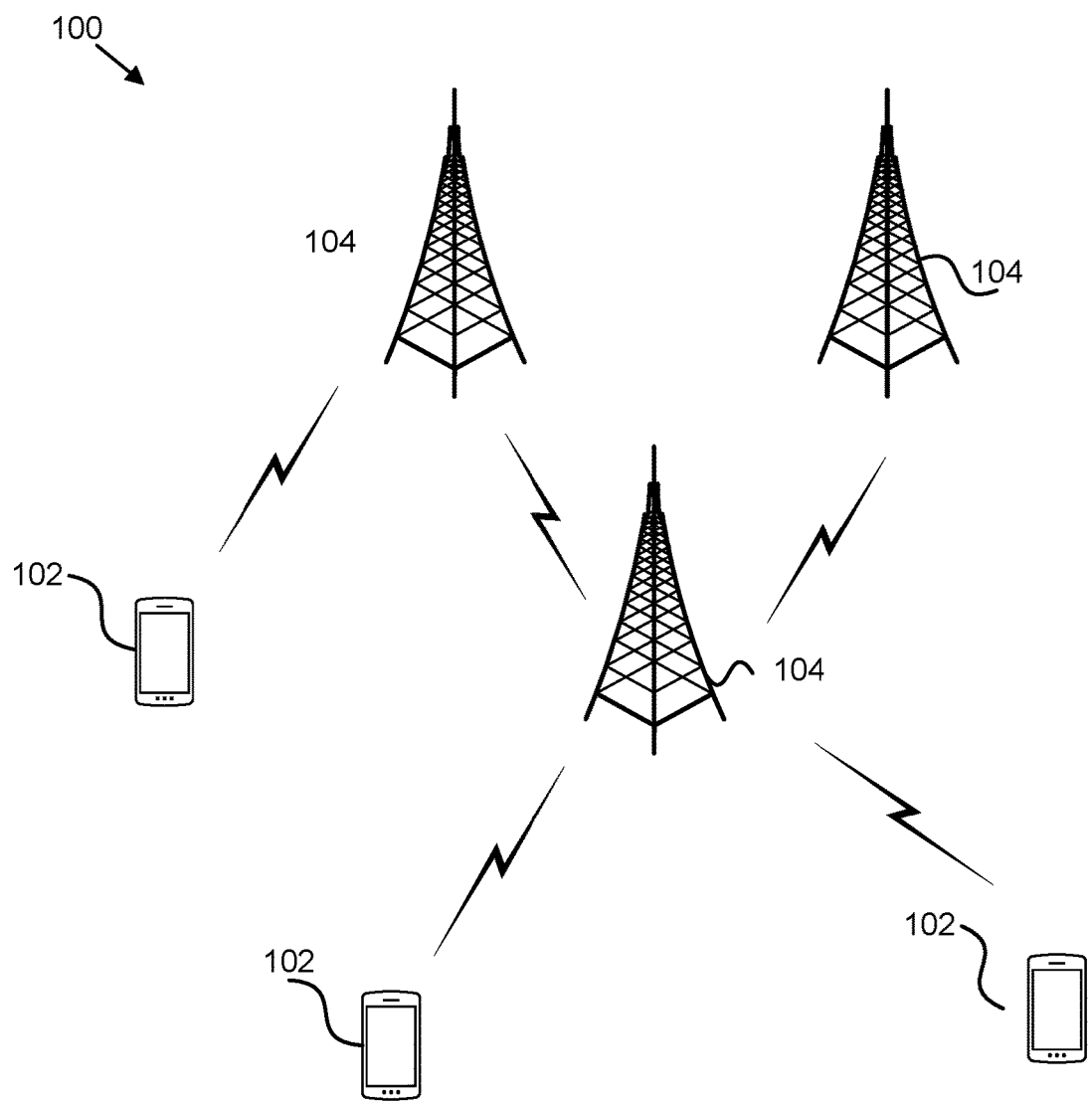
FIG. 1 is a schematic block diagram illustrating one embodiment of a wireless communication system for carrier determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for carrier determination. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), low throughput devices, low delay sensitivity devices, ultra-low cost devices, low power consumption devices, an IoT device, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or a PGW.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. In another implementation, the remote units 102 transmit on the UL using a B-IFDMA scheme when it is operated on unlicensed spectrum. In B-IFDMA, the minimum transmission unit is one interlace, which is a set of RBs uniformly spaced in frequency and has a frequency span that exceeds a predetermined percent of the system bandwidth. For a 20 MHz system bandwidth with 100 PRBs, if it is divided into 10 interlaces, then the $k^{th}$ interlace is composed of the PRBs $\{k, k+10, k+20, \ldots, k+90\}$ and the $(k+1)^{th}$ interlace is composed of the PRBs $\{k+1, k+11, k+21, \ldots, k+91\}$, $0<=k<=9$. In another implementation, the wireless communication system 100 is compliant with NB-IoT. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., base unit 102) may determine a first carrier of multiple carriers for a first device to transmit control information. In some embodiments, the apparatus may determine the first carrier based on at least one of a load condition and an interference condition on the multiple carriers. In certain embodiments, the apparatus may transmit, to the first device, a first physical control signal indicating the first carrier. In various embodiments, the first physical control signal further indicates an interlace index to the first device. In some embodiments, the first physical control signal further indicates an orthogonal cover sequence index to the first device. In certain embodiments, the apparatus may determine a time for the first device to transmit control information, transmit, to the first device, a third physical control signal indicating the determined time, and receive control information from the first device during the determined time. In some embodiments, the third physical control signal may indicate a delay after the end of a transmission burst. In certain embodiments, the apparatus may determine a random backoff counter for the first device, and transmit, to the first device, a fourth physical control signal indicating the random backoff counter. In some embodiments, the apparatus may receive control information from the first device on the first carrier. Therefore, the base unit 104 may determine a carrier to be used by the first device and other devices.

In a further embodiment, an apparatus (e.g., remote unit 104) may receive a first physical control signal indicating a first carrier of multiple carriers for transmitting control information. In some embodiments, the first physical control signal further indicates an interlace index for transmitting control information. In various embodiments, the first physical control signal further indicates an orthogonal cover sequence index for transmitting control information. In certain embodiments, the apparatus receives a third physical control signal indicating a time, and transmits control information during the time. In some embodiments, the third physical control signal indicates a delay after the end of a transmission burst. In certain embodiments, the apparatus may receive a fourth physical control signal indicating a random backoff counter, and perform LBT using the random backoff counter on the first carrier. The apparatus may also transmit control information on the first carrier.

Figure 2:
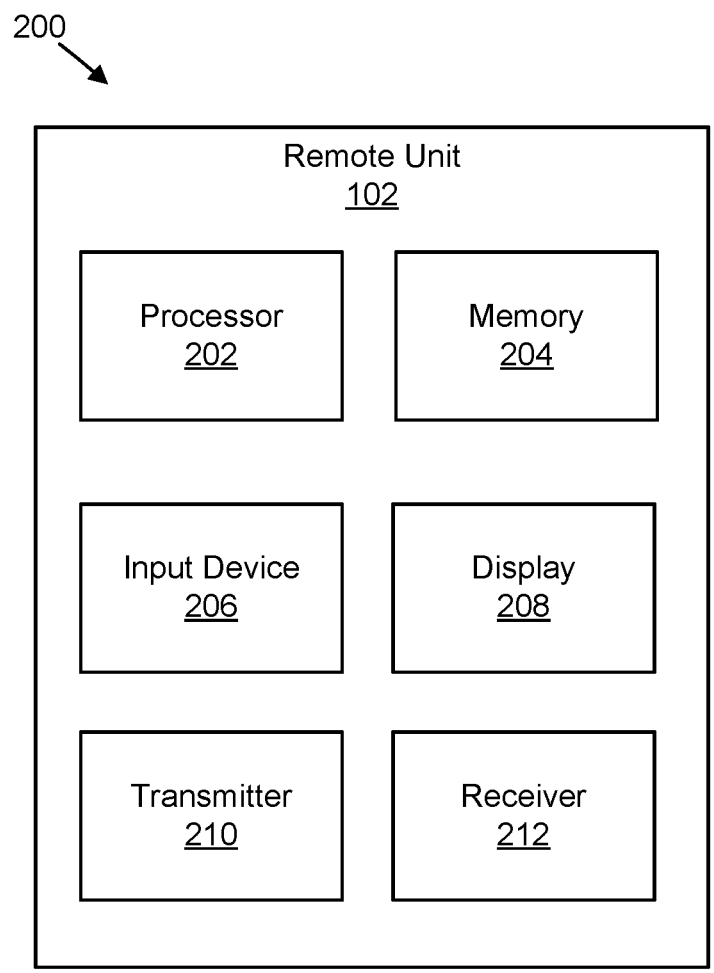
FIG. 2 is a schematic block diagram illustrating one embodiment of an apparatus that may be used for carrier determination.

FIG. 2 depicts one embodiment of an apparatus 200 that may be used for carrier determination. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may perform an LBT.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 is used to receive a first physical control signal indicating a first carrier of multiple carriers for transmitting control information. In one embodiment, the transmitter 210 is used to transmit data, feedback information, and/or an indication to the base unit 104. In certain embodiments, the transmitter 210 is used to transmit control information on the first carrier. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
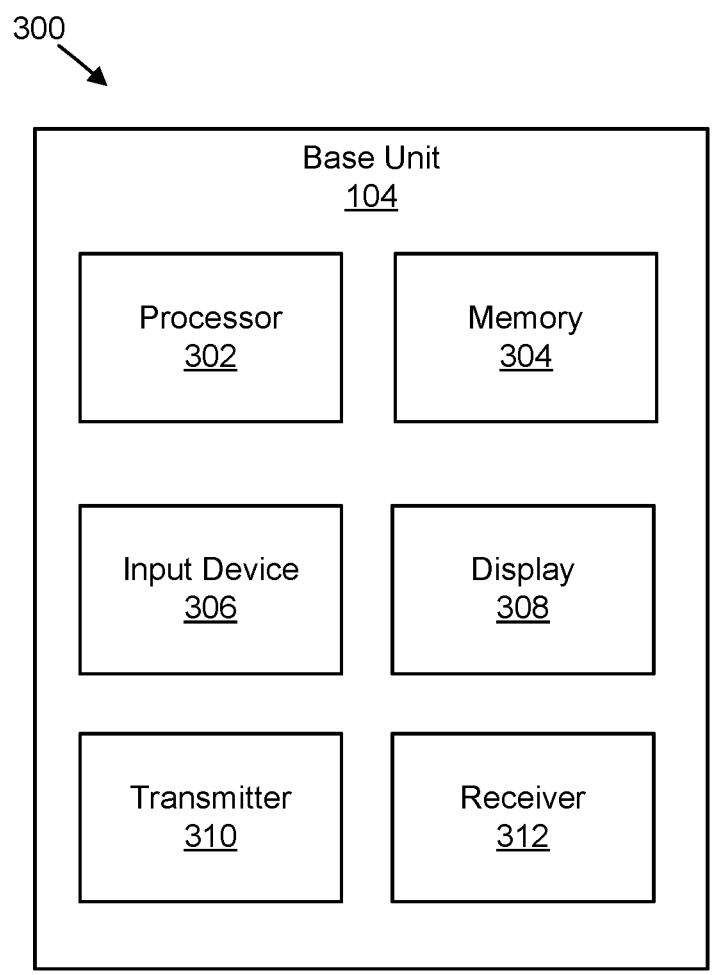
FIG. 3 is a schematic block diagram illustrating one embodiment of an apparatus that may be used for carrier determination.

FIG. 3 depicts one embodiment of an apparatus 300 that may be used for carrier determination. The apparatus 300 includes one embodiment of the base unit 104. Furthermore, the base unit 104 may include a processor 302, a memory 304, an input device 306, a display 308, a transmitter 310, and a receiver 312. It should be noted that the processor 302, the memory 304, the input device 306, and the display 308 may be substantially similar to the processor 202, the memory 204, the input device 206, and the display 208 of the remote unit 102, respectively. In certain embodiments, the processor 302 may be used to determine a first carrier of multiple carriers for a first device to transmit control information.

The transmitter 310 is used to provide DL communication signals to the remote unit 102 and the receiver 312 is used to receive UL communication signals from the remote unit 102. In certain embodiments, the transmitter 310 is used to transmit, to the first device, a first physical control signal indicating the first carrier. In one embodiment, the receiver 312 may be used to receive control information from the first device on the first carrier. It should be noted that, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
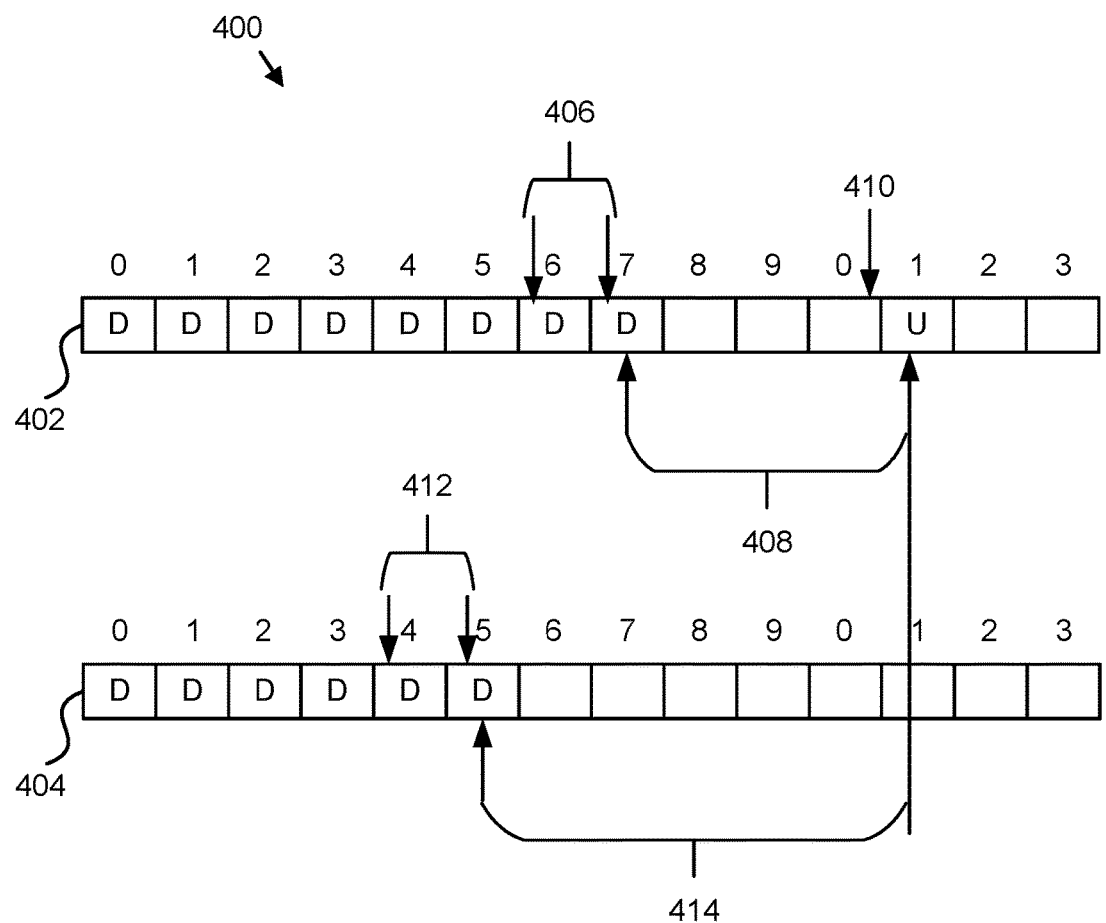
FIG. 4 illustrates one embodiment of carrier transmissions.

FIG. 4 illustrates one embodiment of carrier transmissions 400. The illustrated carrier transmissions 400 include transmissions on a first carrier 402 and transmissions on a second carrier 404. It should be noted that the first carrier 402 and/or the second carrier 404 may be licensed or unlicensed carriers. In some embodiments, PUCCH transmission in the UL on an unlicensed carrier is used. The first carrier 402 includes DL transmissions from a base unit 104 in subframes 0 through 7—labeled with "D." The DL transmissions in subframes 0 through 7 may be considered one DL burst or one transmission burst. It should be noted that a DL burst or a transmission burst may refer to information transmitted in consecutive subframes. The DL burst includes one or more physical control signals 406. In one embodiment, the one or more physical control signals 406 may include information in a common DCI format 1C. In certain embodiments, the one or more physical control signals 406 may include information indicating a carrier of multiple carriers for a device to transmit control information, an interlace index for the device, and/or an orthogonal cover sequence index for the device. In various embodiments, the one or more physical control signals 406 may include information indicating a control channel for the device (e.g., at least one of an interlace index and an orthogonal cover sequence index), a time for the device to transmit control information (e.g., such as an indication of a delay after an end of the DL burst), and/or a random backoff counter (the random backoff counter may be used to perform LBT). In certain embodiments, the one or more physical control signals 406 may be transmitted in remote unit-specific search space for indicating remote unit-specific information.

In one embodiment, a delay 408 is indicated in the one or more physical control signals 406 that delays transmission of control information for a period of time after the end of the DL burst. In another embodiment, the delay 408 may be preconfigured. In the illustrated embodiment, the first carrier 402 is indicated by the one or more physical control signals 406 as the carrier to be used to transmit control information. Accordingly, an LBT 410 is performed before UL control information is transmitted in subframe 1—labeled "U."

The second carrier 404 includes DL transmissions from the base unit 104 in subframes 0 through 5—labeled with "D." The DL transmissions in subframes 0 through 5 may be considered one DL burst or one transmission burst. The DL burst includes one or more physical control signals 412. In one embodiment, the one or more physical control signals 412 may include information in a common DCI format 1C. In certain embodiments, the one or more physical control signals 412 may include information indicating a carrier of multiple carriers for a device to transmit control information, an interlace index for the device, and/or an orthogonal cover sequence index for the device. In various embodiments, the one or more physical control signals 412 may include information indicating a control channel for the device (e.g., at least one of an interlace index and an orthogonal cover sequence index), a time for the device to transmit control information (e.g., such as an indication of a delay after an end of the DL burst), and/or a random backoff counter (the random backoff counter may be used to perform LBT). In certain embodiments, the one or more physical control signals 406 may be transmitted in remote unit-specific search space for indicating remote unit-specific information.

In one embodiment, a delay 414 is indicated in the one or more physical control signals 412 that delays transmission of control information for a period of time after the end of the DL burst. In another embodiment, the delay 414 may be preconfigured. In the illustrated embodiment, the first carrier 402 is indicated by the one or more physical control signals 412 as the carrier to be used to transmit control information.

In certain embodiments, the one or more physical control signals 406 and 412 may indicate an interlace for multiple remote units 102 to transmit UL information. For example, to improve utilization efficiency of B-IFDMA based PUCCH transmissions, for DL multi-carrier operation on an unlicensed spectrum, HARQ-ACK bits for DL bursts on multiple unlicensed carriers may be transmitted in one interlace for PUCCH transmission. In one embodiment, for each unlicensed carrier carrying DL burst and sharing the same interlace for PUCCH transmission, a carrier index for the unlicensed carrier using for PUCCH transmission may be indicated by the one or more physical control signals 406 and 412, such as by being indicated in the common DCI format 1C for DL burst in an end subframe. In certain embodiments, a base unit 104 may determine the carrier to use and/or the carrier index corresponding to the carrier to use. Accordingly, the base unit 104 may dynamically balance the load of UCI on one carrier and/or quickly select one unlicensed carrier with a best channel condition or least amount of interference (this may be based on an RSSI measurement reported by a remote unit 102). Thus, for a DL burst transmission on the first carrier 402 and a DL burst transmission on the second carrier 404, all of the remote units 102 scheduled in the DL burst on the first carrier 402 may share one interlace with all of the remote units 102 scheduled in the DL burst on the second carrier 404. The shared interlace may be used for HARQ-ACK transmission. If the first carrier 402 is selected by the base unit 104 for PUCCH transmission due to better channel condition than the second carrier 404, a carrier index corresponding to the first carrier 402 may be indicated in the one or more physical control signals 406 and 412. In another embodiment, the carrier index corresponding to the first carrier 402 may be indicated in DL grant signaling associated with PDSCH to each remote unit 102.

In some embodiments, the one or more physical control signals 406 and 412 may indicate an interlace that is shared by multiple remote units 102. In one embodiment, the interlace may be explicitly indicated in the one or more physical control signals 406 and 412 using a concrete interlace number and/or an index. In certain embodiments, a remote unit 102 may be preconfigured to establish a link between a number of OFDM symbols in a DL burst end subframe with an interlace number and/or index. For example, in one embodiment, an interlace number may equal a number of OFDM symbols in the DL burst end subframe mod a number of interlaces per UL subframe. In certain embodiments, for DL multi-carriers sharing one interlace for PUCCH transmission, the base unit 104 may make an end subframe configuration the same for DL bursts on those carriers.

In certain embodiments, the one or more physical control signals 406 and 412 may indicate an orthogonal cover sequence index for each remote unit 102 to use. It should be noted that after a remote unit 102 had determined an interlace and an orthogonal cover sequence index for PUCCH transmission, the remote unit 102 may transmit the PUCCH on the determined PUCCH resource. In this way, a base unit 104 may flexibly assign the PUCCH resource for one remote unit 102.

In various embodiments, the one or more physical control signals 406 and 412 may explicitly indicate a concrete exact orthogonal cover sequence index for PUCCH transmission in the DL grant for each remote unit 102. In such embodiments, two bits may be used to support four-remote unit 102 multiplexing and three bits may be used to support eight-remote unit 102 multiplexing.

In some embodiments, a remote unit 102 may be preconfigured to establish a link between a lowest CCE index for DL grant DCI transmission with an orthogonal cover sequence index for PUCCH transmission. For example, in one embodiment, an orthogonal cover sequence index may correspond to a lowest CCE index for DL grant DCI transmission mod a number of orthogonal cover sequences.

In some embodiments, the one or more physical control signals 406 and 412 may indicate a time for a remote unit 102 to transmit control information. In one embodiment, the time for transmission of control information may be indicated using a common indicator for multiple remote units 102. For example, in an embodiment in which a DL burst and a corresponding HARQ-ACK are transmitted in different carriers, the subframe timing info (e.g., subframe offset between the end subframe of the DL burst on one unlicensed carrier and the subframe for PUCCH transmission on another unlicensed carrier) may be indicated in the common DCI format 1C on each unlicensed carrier that DL burst is transmitted on.

For example, assuming PUCCH is transmitted in the first carrier 402, as illustrated, the subframe offset (e.g., delay 408) between the end subframe of the DL burst of the first carrier 402 and the subframe for PUCCH transmission may be indicated in common DCI format 1C for the DL burst of the first carrier 402 (e.g., in the one or more physical control signals 406). Furthermore, the subframe offset (e.g., delay 414) between the end subframe of DL burst of the second carrier 404 and the subframe for PUCCH transmission may be indicated in common DCI format 1C for the DL burst of the second carrier 404 (e.g., in the one or more physical control signals 412). It should be noted that the two offset values (e.g., delay 408 and delay 414) may be different. In some embodiments, the base unit 104 may indicate different offset values so that the same subframe for is used for PUCCH transmission.

In various embodiments, a concrete subframe offset between a current DL subframe and a subframe for PUCCH transmission is indicated in DL grant for one remote unit 102 when the associated PDSCH is scheduled in a DL subframe. In this way, a base unit 104 may flexibly assign the PUCCH transmission for one remote unit 102 and flexibly multiplex several remote units' PUCCH in one interlace.

In some embodiments, the one or more physical control signals 406 and 412 may indicate a random backoff counter to be used for LBT. LBT is performed before PUCCH transmission on an unlicensed carrier. Moreover, a subframe carrying PUCCH on a carrier may be a single burst only for PUCCH transmission or a subframe of an UL burst supporting PUCCH and PUSCH multiplexed in one subframe. For PUCCH transmission, one-shot CCA of at least 25 us or LBT category 4 may be used with smaller contention window size compared to PUSCH transmission.

To enable multiple remote units' PUCCH and PUSCH to be multiplexed in one subframe, a base unit 104 may generate a common random backoff counter and indicate the detailed value of the random backoff counter in the common DCI format 1C on the DL burst for PUCCH transmission (e.g., the one or more physical control signals 406 and 412) and indicate the same value in the UL grant for scheduled PUSCH transmission. In this way, a remote unit 102 may know the concrete time domain and frequency domain position for PUCCH transmission. For example, for LBT in 410, using the random backoff counter as an initial count, the initial count may be counted down by subtracting 1 if the first carrier 402 in one ECCA slot is regarded as idle by energy check, e.g., the received energy does not exceed a predefined threshold; if the first carrier 402 in one ECCA slot is regarded as busy by energy check, the count may be not counted down and next ECCA check can be performed until the channel keeps idle for a predefined period of time. When the count is counted down to zero, the LBT procedure is finished and the remote unit 102 may start control information transmission on the first carrier 402. As described herein, utilization efficiency of an interlace of one PUCCH may be improved.

As used herein, an interlace may include multiple PRBs. Furthermore, each PRB of an interlace may be uniformly spaced in frequency. Furthermore, the PRBs of an interlace are separated by substantially equal (e.g., similar) frequencies. For a given system bandwidth, assuming there are X PRBs $\{0, 1, \ldots, -1\}$ available to be equally divided to Y interlaces $\{0, 1, \ldots, Y-1\}$, then each interlace is composed of X/Y PRBs and has a frequency span that exceeds a predetermined percent of the system bandwidth. So the $k^{th}$ interlace is composed of the PRBs $\{k, k+Y, k+2Y, \ldots, k+(X/Y-1)Y\}$ and the $(k+1)^{th}$ interlace is composed of the PRBs $\{k+1, k+1+Y, k+1+2Y, \ldots, k+1+(X/Y-1)Y\}$, where, $0<=k<=Y-1$. Then the two interlaces, the $(k+1)^{th}$ interlace and the $k^{th}$ interlace, are adjacent in frequency. For example, for a 20 MHz system bandwidth with 100 PRBs, if it is divided into 10 interlaces, then the $k^{th}$ interlace is composed of the PRBs $\{k, k+10, k+20, \ldots, k+90\}$ and the $(k+1)^{th}$ interlace is composed of the PRBs $\{k+1, k+11, k+21, \ldots, k+91\}$, $0<=k<=9$. So the two interlaces, the $k^{th}$ interlace and the $(k+1)^{th}$ interlace are adjacent to each other and consecutive in frequency. Similarly, the $k^{th}$ interlace and the $(k-1)^{th}$ interlace are also adjacent to each other and consecutive in frequency. In another example, two interlaces being adjacent in frequency may mean that all the PRBs of one interlace (e.g., PRB $\{x, y, z,$ and so forth$\}$) that are uniformly spaced in frequency are adjacent to all the PRBs of another interlace (e.g., PRB$\{x+/-1, y+/-1, z+/-1,$ and so forth$\}$).

Figure 5:
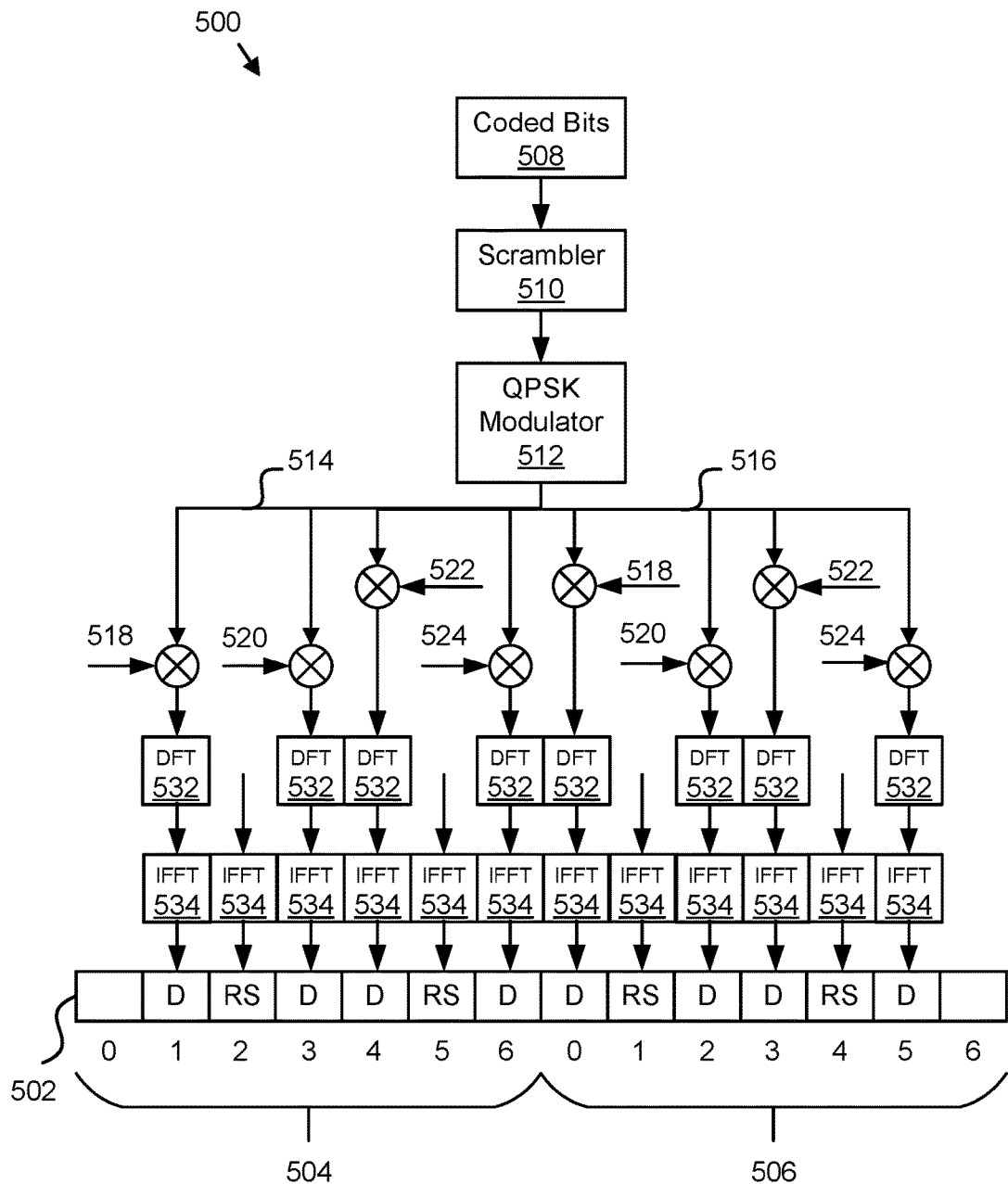
FIG. 5 illustrates one embodiment of a channel structure for multiplexing control information.

FIGS. 5 thorough 7 describe various embodiments for PUCCH channel structure supporting multi-remote unit 102 multiplexing in one interlace.

Specifically, FIG. 5 illustrates one embodiment of a channel structure 500 for multiplexing control information. The channel structure 500 may be for PUCCH transmission on a LAA SCell and may be used to multiplex channel information for up to 4 remote units 102 in one interlace. The channel structure 500 includes a subframe 502 having a first slot 504 and a second slot 506. To create the channel structure 500, coded bits 508 are input to a scrambler 510. The scrambler 510 may scramble (e.g., transpose and/or invert) the coded bits 508 then output the scrambled coded bits to a QPSK modulator 512. After the QPSK modulator 512 modulates the scrambled coded bits, a first half of symbols 514 are split from a second half of symbols 516. Orthogonal cover sequences w0 518, w1 520, w2 522, and w3 524 are applied to the first half of symbols 514 and to the second half of symbols 516. The resulting signals use a discrete Fourier transform ("DFT") 532 to convert a time domain signal into frequency components and an inverse fast Fourier transform ("IFFY") 534 to convert symbols from the frequency domain to the time domain.

An orthogonal cover sequence is used in the time domain to differentiate remote units 102 and is applied per slot (e.g., the first slot 504 and the second slot 506). Considering one-symbol duration may be reserved for PUCCH LBT and another one symbol may be reserved for possible SRS transmission in same subframe, 6 symbols including DMRS (labeled "RS") and data symbols (labeled "D") per slot may be used for PUCCH transmission. In the illustrated embodiment, the first symbol (e.g., symbol 0 in the first slot 504) and/or the last symbol (e.g., symbol 6 in the second slot 506) may be reserved for LBT or SRS. In each of the first slot 504 and the second slot 506, each of the two DMRS symbols is inserted between two consecutive data symbols to improve channel estimation performance. Because four symbols are available for data per slot, the channel structure 500 may support up to 4 remote units' PUCCH multiplexed in one interlace in one subframe using four orthogonal cover sequences $\{w0$ 518, $w1$ 520, $w2$ 522, $w3$ 524$\}$ (e.g., $\{+1,+1,+1,+1\}$, $\{+1,-1,+1,-1\}$, $\{+1,+1,-1,-1\}$, $\{+1,-1,-1,+1\}$) used to differentiate different remote units 102.

Figure 6:
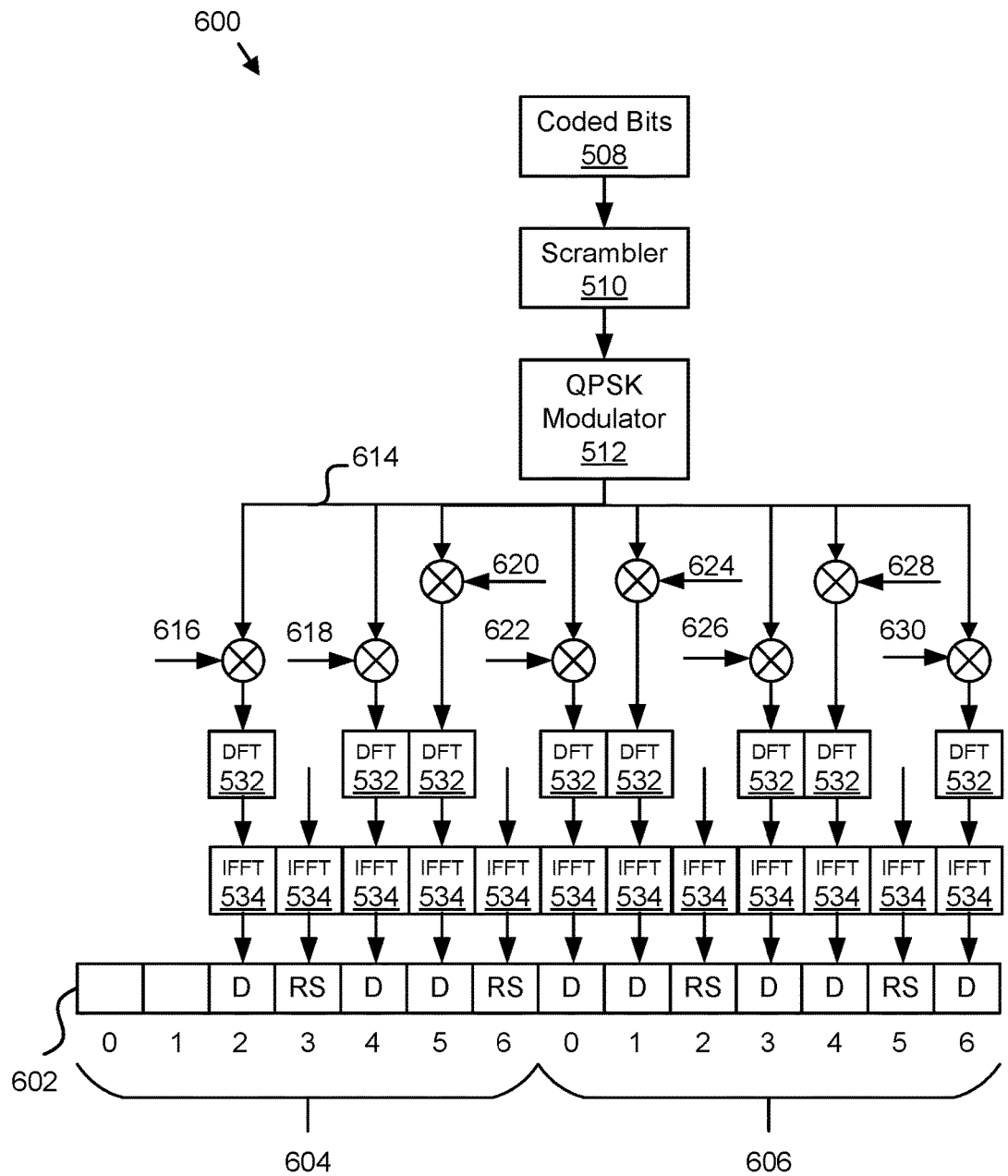
FIG. 6 illustrates another embodiment of a channel structure for multiplexing control information.

FIG. 6 illustrates another embodiment of a channel structure 600 for multiplexing control information. The channel structure 600 may be for PUCCH transmission on a LAA SCell and may be used to multiplex channel information for up to 8 remote units in one interlace. The channel structure 600 includes a subframe 602 having a first slot 604 and a second slot 606. To create the channel structure 600, coded bits 508 are input to a scrambler 510.

The scrambler 510 may scramble (e.g., transpose and/or invert) the coded bits 508 then output the scrambled coded bits to a QPSK modulator 512. After the QPSK modulator 512 modulates the scrambled coded bits, symbols 614 have orthogonal cover sequences w0 616, w1 618, w2 620, w3 622, w4 624, w5 626, w6 628, and w7 630 applied thereto. The resulting signals use a DFT 532 to convert a time domain signal into frequency components and an IFFT 534 to convert symbols from the frequency domain to the time domain.

An orthogonal cover sequence is used in the time domain to differentiate remote units 102 and is applied per the subframe 602. Accordingly, the capacity in this embodiment is dependent on a number of data symbols per the subframe 602. Considering that a total of two symbols are reserved for LBT and/or possible SRS transmission in one subframe, 12 symbols including DMRS (labeled "RS") and data symbols (labeled "D") per subframe are used for PUCCH transmission. In the illustrated embodiment, the first two symbols (e.g., symbols 0 and 1 in the first slot 604) are reserved for LBT and/or SRS. In each subframe 602, each of the four DMRS symbols is inserted between two consecutive data symbols to improve channel estimation performance. Because eight symbols are available for data per subframe 602, the channel structure 600 may support up to 8 remote units' PUCCH multiplexed in one interlace in one subframe using eight orthogonal cover sequences $\{w0$ 616, $w1$ 618, $w2$ 620, $w3$ 622, $w4$ 624, $w5$ 626, $w6$ 628, $w7$ 630$\}$ (e.g., $\{+1,+1,+1,+1,+1,+1,+1,+1\}$, $\{+1,-1,+1,-1,+1,-1,+1,-1\}$, $\{+1,+1,+1,+1,-1,-1,-1,-1\}$, $\{+1,+1,-1,-1,+1,+1,-1,-1\}$, $\{+1,-1,-1,+1,+1,-1,-1,+1\}$, $\{-1,-1,+1,+1,-1,-1,+1,+1\}$, $\{-1,-1,-1,-1,+1,+1,+1,+1\}$, $\{-1,+1,-1,+1,-1,+1,-1,+1\}$) used to differentiate different remote units 102.

Figure 7:
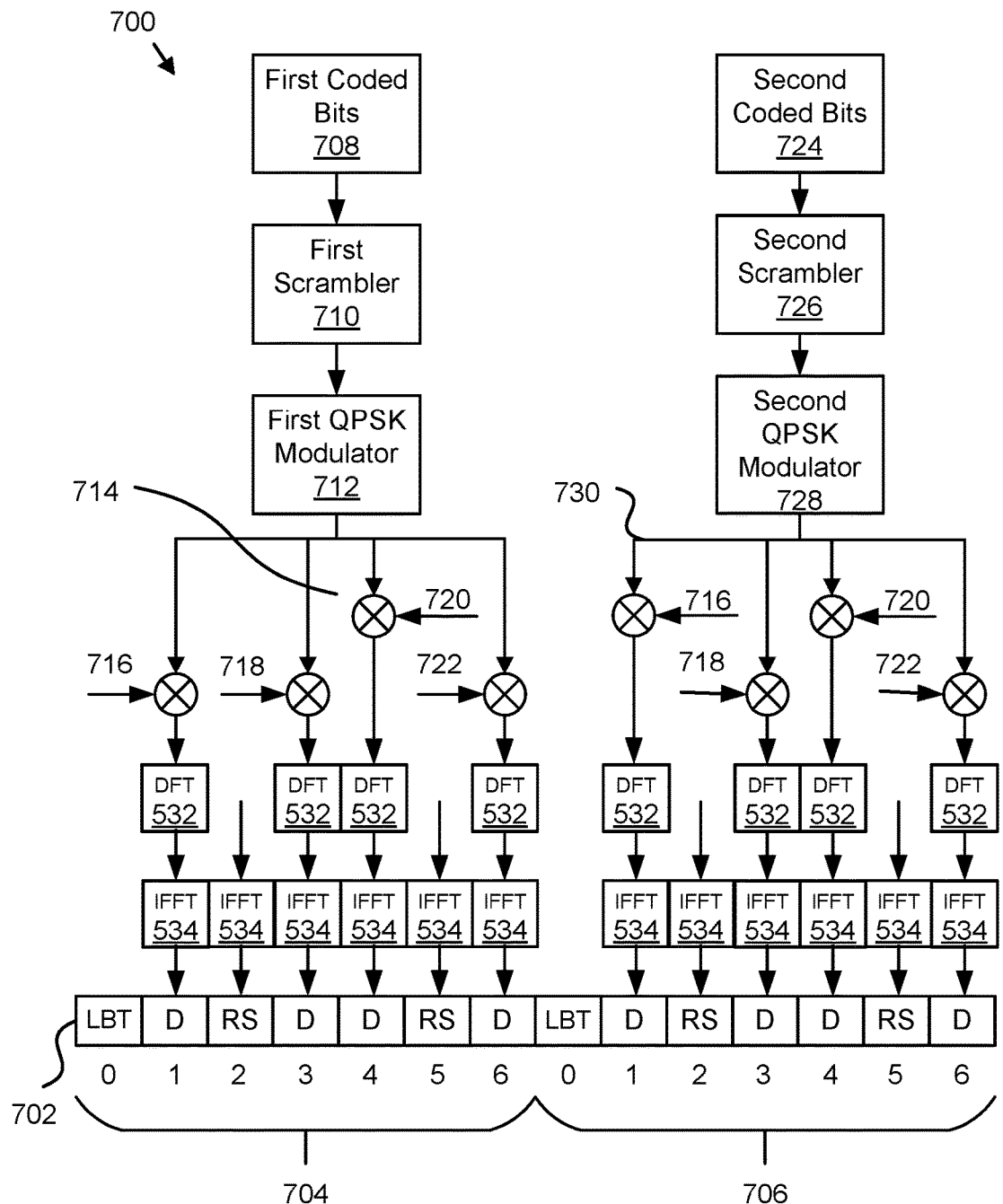
FIG. 7 illustrates a further embodiment of a channel structure for multiplexing control information.

FIG. 7 illustrates a further embodiment of a channel structure 700 for multiplexing control information. The channel structure 700 may be for PUCCH transmission on a LAA SCell and may be used to multiplex channel information for up to 8 remote units in one interlace. The channel structure 700 includes a subframe 702 having a first slot 704 and a second slot 706. To create the channel structure 700, first coded bits 708 are input to a first scrambler 708. The first scrambler 708 may scramble (e.g., transpose and/or invert) the first coded bits 708 then output the scrambled first coded bits to a first QPSK modulator 712. After the first QPSK modulator 712 modulates the scrambled coded bits, symbols 714 have orthogonal cover sequences w0 716, w1 718, w2 720, and w3 722 applied thereto. The resulting signals use a DFT 532 to convert a time domain signal into frequency components and an IFFT 534 to convert symbols from the frequency domain to the time domain. Moreover, second coded bits 724 are input to a second scrambler 726. The second scrambler 726 may scramble (e.g., transpose and/or invert) the second coded bits 724 and output the scrambled second coded bits to a second QPSK modulator 728. After the second QPSK modulator 728 modulates the scrambled coded bits, symbols 730 have orthogonal cover sequences w0 716, w1 718, w2 720, and w3 722 applied thereto. The resulting signals use a DFT 532 to convert a time domain signal into frequency components and an IFFT 534 to convert symbols from the frequency domain to the time domain.

An orthogonal cover sequence is used in the time domain to differentiate remote units 102 in one slot (e.g., the first slot 704 and the second slot 706). One subframe 702 for PUCCH transmission is divided into two slots and each slot may use one interlace for one PUCCH transmission, so each subframe 702 may support two independent PUCCH transmissions. Considering the duration for PUCCH LBT may be limited in one symbol, 6 symbols including DMRS (labeled "RS") and data symbols (labeled "D") per slot may be used for PUCCH transmission. In the illustrated embodiment, the first or last symbol in each slot may be reserved for LBT (e.g., symbol 0 in the first slot 704 and symbol 0 in the second slot 706). In each of the first slot 704 and the second slot 706, each of the two DMRS symbols may be inserted between two consecutive data symbols to improve channel estimation performance. Because four symbols are available for data per slot, the channel structure 700 may enable one slot to support up to 4 remote units' PUCCH multiplexed in one interlace in one subframe using four orthogonal cover sequences {w0 716, w1 718, w2 720, w3 722} (e.g., {+1,+1,+1,+1}, {+1,−1,+1,−1}, {+1,+1,−1,−1}, {+1,−1,−1,+1}) used to differentiate different remote units 102.

As explained in FIGS. 4 through 7, a dynamic carrier indication may be provided to remote units 102 for PUCCH transmission in one carrier for multiple remote units 102, a common interlace indication may be provided to remote units 102 for B-IFDMA based PUCCH transmission an orthogonal cover sequence indication may be provided to remote units 102 for multi-remote unit 102 multiplexing in one subframe, a common HARQ timing indication may be provided to remote units 102 for all the remote units 102 scheduled in one subframe and/or all the subframes within one DL burst for a remote unit 102, multiple PUCCH/ PUSCH multiplexing in one subframe may be enabled by a common LBT, and/or various PUCCH channel structures may be used.

Figure 8:
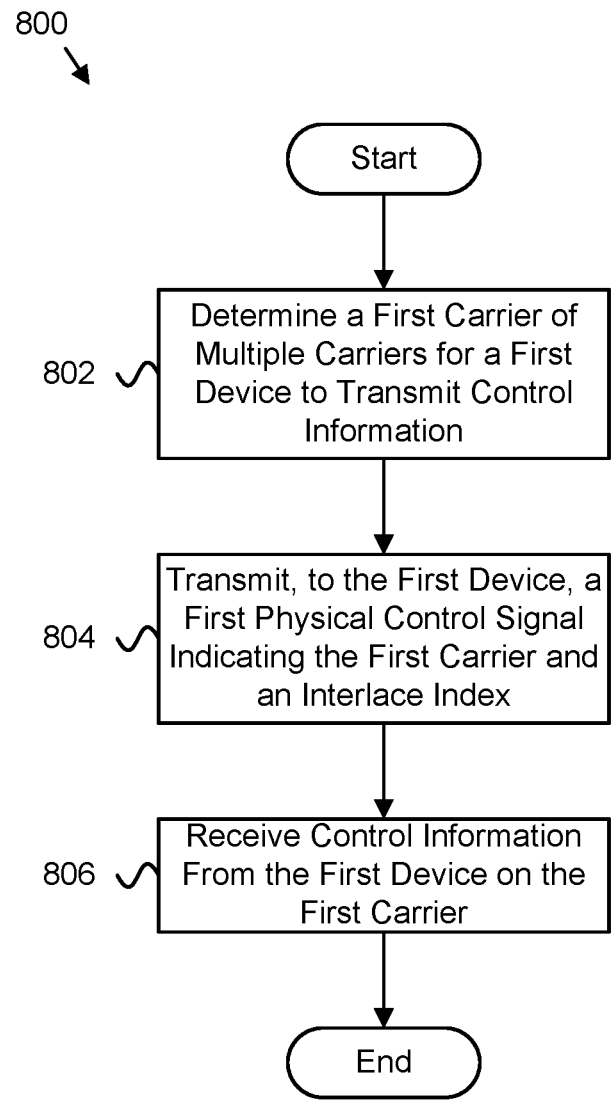
FIG. 8 is a schematic flow chart diagram illustrating one embodiment of a method for carrier determination.

FIG. 8 is a schematic flow chart diagram illustrating one embodiment of a method 800 for carrier determination. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include determining 802 a first carrier of multiple carriers for a first device to transmit control information. In some embodiments, the method 800 may determine 802 the first carrier based on at least one of a load condition and an interference condition on the multiple carriers. The method 800 may also include transmitting 804, to the first device, a first physical control signal indicating the first carrier and an interlace index. In some embodiments, the first physical control signal further indicates an orthogonal cover sequence index to the first device. In various embodiments, the first physical control signal may indicate the first carrier, the interlace index, and the orthogonal cover sequence index. In some embodiments, the method 800 may transmit the first physical control signal to a second device, and the method 800 may receive control information from the second device on the first carrier. In such embodiments, the first physical control signal may indicate the first carrier, an interlace index, and/or an orthogonal cover sequence index. The method 800 may include receiving 806 control information from the first device on the first carrier.

In one embodiment, the method 800 determines a control channel for the first device. The control channel may be defined by at least one of an interlace index and an orthogonal cover sequence index. In such an embodiment, the method 800 may transmit, to the first device, a second physical control signal indicating the control channel and the method 800 may receive control information from the first device using the control channel. In some embodiments, the method 800 may determine a time for the first device to transmit control information, transmit, to the first device, a third physical control signal indicating the determined time, and receive control information from the first device during the determined time. In certain embodiments, the method 800 may transmit the third physical control signal to a second device, and receive control information from the second device during the determined time. In some embodiments, the third physical control signal indicates a delay after the end of a transmission burst.

In certain embodiments, the method 800 may determine a random backoff counter for the first device, and transmit, to the first device, a fourth physical control signal indicating the random backoff counter. In various embodiments, the method 800 may transmit, to a second device, the fourth physical control signal.

Figure 9:
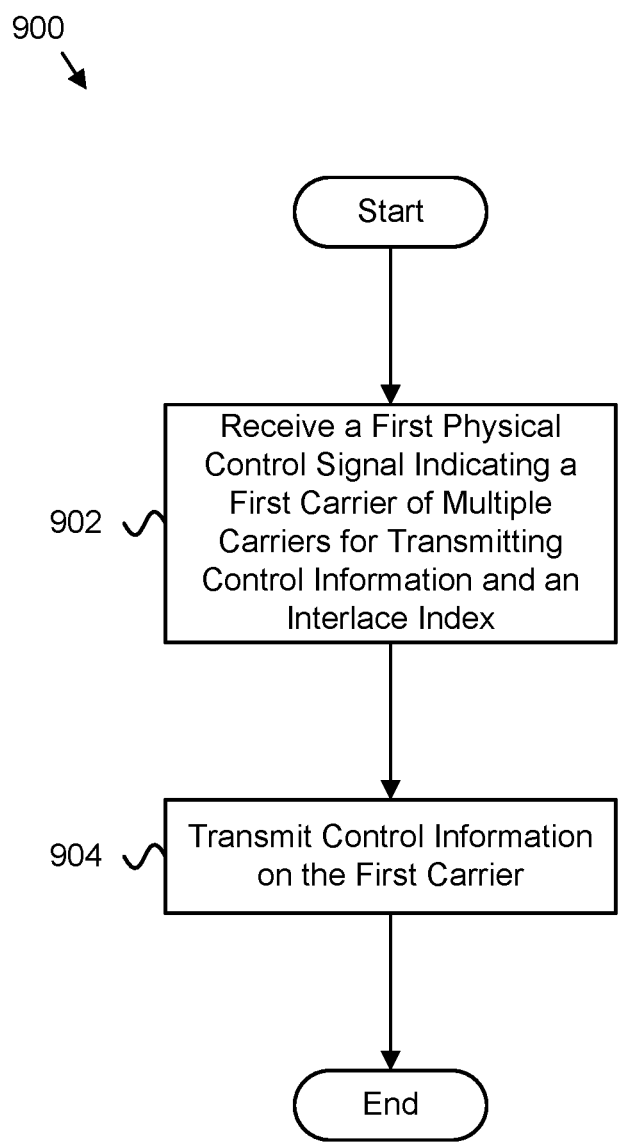
FIG. 9 is a schematic flow chart diagram illustrating another embodiment of a method for carrier determination.

FIG. 9 is a schematic flow chart diagram illustrating another embodiment of a method 900 for carrier determination. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a first physical control signal indicating a first carrier of multiple carriers for transmitting control information and an interlace index. In various embodiments, the first physical control signal further indicates an orthogonal cover sequence index for transmitting control information. In certain embodiments, the first physical control signal may indicate the first carrier, the interlace index, and the orthogonal cover sequence index. The method 900 may also include transmitting 904 control information on the first carrier. In some embodiments, the method 900 may include transmitting 904 control information on the first carrier using the interlace index.

In some embodiments, the method 900 includes receiving a second physical control signal indicating a control channel. The control channel may be defined by at least one of an interlace index and an orthogonal cover sequence index. In such embodiments, the method 900 includes transmitting control information using the control channel. In certain embodiments, the method 900 includes receiving a third physical control signal indicating a time, and transmitting control information during the time.

In some embodiments, the third physical control signal indicates a delay after the end of a transmission burst. In certain embodiments, the method 900 includes receiving a fourth physical control signal indicating a random backoff counter, and performing LBT using the random backoff counter on the first carrier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor that determines a first carrier of a plurality of carriers for a first device to transmit first hybrid automatic repeat request acknowledgement feedback information;
a transmitter that:
transmits, to the first device, first downlink control information indicating the first carrier, wherein the first downlink control information further indicates a set of physical resource blocks within the first carrier to the first device; and
transmits second downlink control information to a second device, wherein the second downlink control information indicates the first carrier and the set of physical resource blocks within the first carrier for the second device to transmit second hybrid automatic repeat request acknowledgement feedback information; and
a receiver that:
receives the first hybrid automatic repeat request acknowledgement feedback information from the first device on the first carrier using the set of physical resource blocks; and
receives the second hybrid automatic repeat request acknowledgement feedback information from the second device on the first carrier using the set of physical resource blocks.

2. The apparatus of claim 1, wherein the first downlink control information further indicates an orthogonal cover sequence index to the first device.

3. The apparatus of claim 1, wherein:
the processor determines a control channel for the first device, wherein the control channel is defined by at least one of the set of physical resource blocks and an orthogonal cover sequence index, and the first downlink control information indicates the control channel; and
the receiver receives the first hybrid automatic repeat request acknowledgement feedback information from the first device using the control channel.

4. The apparatus of claim 1, wherein:
the processor determines a time for the first device to transmit the first hybrid automatic repeat request acknowledgement feedback information;
the transmitter transmits, to the first device, a first indicator indicating a first time offset between a downlink transmission for the first device and the determined time; and
the receiver receives the first hybrid automatic repeat request acknowledgement feedback information from the first device during the determined time.

5. The apparatus of claim 4, wherein:
the transmitter transmits, to the second device, a second indicator indicating a second time offset between a downlink transmission for the second device and the determined time; and the receiver receives the second hybrid automatic repeat request acknowledgement feedback information from the second device during the determined time.

6. The apparatus of claim 1, wherein the first downlink control information indicates an offset between the end of a downlink transmission burst and the start of an uplink transmission burst.

7. The apparatus of claim 1, wherein:
the processor determines a random backoff counter for the first device; and
the transmitter transmits, to the first device, a first indicator indicating the random backoff counter.

8. The apparatus of claim 7, wherein the transmitter transmits, to a second device, a second indicator indicating the random backoff counter.

9. A method comprising:
determining a first carrier of a plurality of carriers for a first device to transmit first hybrid automatic repeat request acknowledgement feedback information;
transmitting, to the first device, first downlink control information indicating the first carrier, wherein the first downlink control information further indicates a set of physical resource blocks within the first carrier to the first device;
transmitting second downlink control information to a second device, wherein the second downlink control information indicates the first carrier and the set of physical resource blocks within the first carrier for the second device to transmit second hybrid automatic repeat request acknowledgement feedback information;
receiving the first hybrid automatic repeat request acknowledgement feedback information from the first device on the first carrier using the set of physical resource blocks; and
receiving the second hybrid automatic repeat request acknowledgement feedback information from the second device on the first carrier using the second set of physical resource blocks.

10. The method of claim 9, wherein the first downlink control information further indicates an orthogonal cover sequence index to the first device.

11. The method of claim 9, further comprising:
determining a control channel for the first device, wherein the control channel is defined by at least one of the set of physical resource blocks and an orthogonal cover sequence index, and the first downlink control information indicates the control channel; and
receiving the first hybrid automatic repeat request acknowledgement feedback information from the first device using the control channel.

12. The method of claim 9, further comprising:
determining a time for the first device to transmit the first hybrid automatic repeat request acknowledgement feedback information;
transmitting, to the first device, a first indicator indicating a first time offset between a downlink transmission for the first device and the determined time; and
receiving the first hybrid automatic repeat request acknowledgement feedback information from the first device during the determined time.

13. The method of claim 12, further comprising:
transmitting, to the second device, a second indicator indicating a second time offset between a downlink transmission for the second device and the determined time; and receiving the second hybrid automatic repeat request acknowledgement feedback information from the second device during the determined time.

14. The method of claim 9, wherein the first downlink control information indicates an offset between the end of a downlink transmission burst and the start of an uplink transmission burst.

15. The method of claim 9, further comprising:
    determining a random backoff counter for the first device; and
    transmitting, to the first device, a first indicator indicating the random backoff counter.

16. The method of claim 15, further comprising transmitting, to a second device, a second indicator indicating the random backoff counter.

17. An apparatus comprising:
    a receiver that receives first downlink control information indicating:
        a first carrier of a plurality of carriers for transmitting hybrid automatic repeat request acknowledgement feedback information; and
        a control channel for transmitting the hybrid automatic repeat request acknowledgement feedback information, wherein the first downlink control information further indicates a set of physical resource blocks within the first carrier for transmitting the hybrid automatic repeat request acknowledgement feedback information, and the control channel is defined by at least one of the set of physical resource blocks and an orthogonal cover sequence index; and
    a transmitter that transmits the hybrid automatic repeat request acknowledgement feedback information on control channel using the set of physical resource blocks.

18. The apparatus of claim 17, wherein the first downlink control information further indicates an orthogonal cover sequence index for transmitting the hybrid automatic repeat request acknowledgement feedback information.

19. The apparatus of claim 17, wherein:
    the receiver receives a first indicator indicating a time offset between a downlink transmission and a time for transmitting the hybrid automatic repeat request acknowledgement feedback information; and
    the transmitter transmits the hybrid automatic repeat request acknowledgement feedback information during the time.

20. The apparatus of claim 17, wherein the first downlink control information indicates a time offset between the end of a downlink transmission burst and the start of an uplink transmission burst.

21. The apparatus of claim 17, further comprising a processor, wherein:
    the receiver receives a second indicator indicating a random backoff counter; and
    the processor performs listen-before-talk using the random backoff counter on the first carrier.

22. A method comprising:
    receiving first downlink control information indicating:
        a first carrier of a plurality of carriers for transmitting hybrid automatic repeat request acknowledgement feedback information; and
        a control channel for transmitting the hybrid automatic repeat request acknowledgement feedback information, wherein the first downlink control information further indicates a set of physical resource blocks within the first carrier for transmitting the hybrid automatic repeat request acknowledgement feedback information, and the control channel is defined by at least one of the set of physical resource blocks and an orthogonal cover sequence index; and
    transmitting the hybrid automatic repeat request acknowledgement feedback information on the control channel using the set of physical resource blocks.

23. The method of claim 22, wherein the first downlink control information further indicates an orthogonal cover sequence index for transmitting the hybrid automatic repeat request acknowledgement feedback information.

24. The method of claim 22, further comprising:
    receiving a first indicator indicating a time offset between a downlink transmission and a time for transmitting the hybrid automatic repeat request acknowledgement feedback information; and
    transmitting the hybrid automatic repeat request acknowledgement feedback information during the time.

25. The method of claim 22, wherein the first downlink control information indicates a time offset between the end of a downlink transmission burst and the start of an uplink transmission burst.

26. The method of claim 22, further comprising:
    receiving a second indicator indicating a random backoff counter; and
    performing listen-before-talk using the random backoff counter on the first carrier.

* * * * *